UNITED STATES PATENT OFFICE.

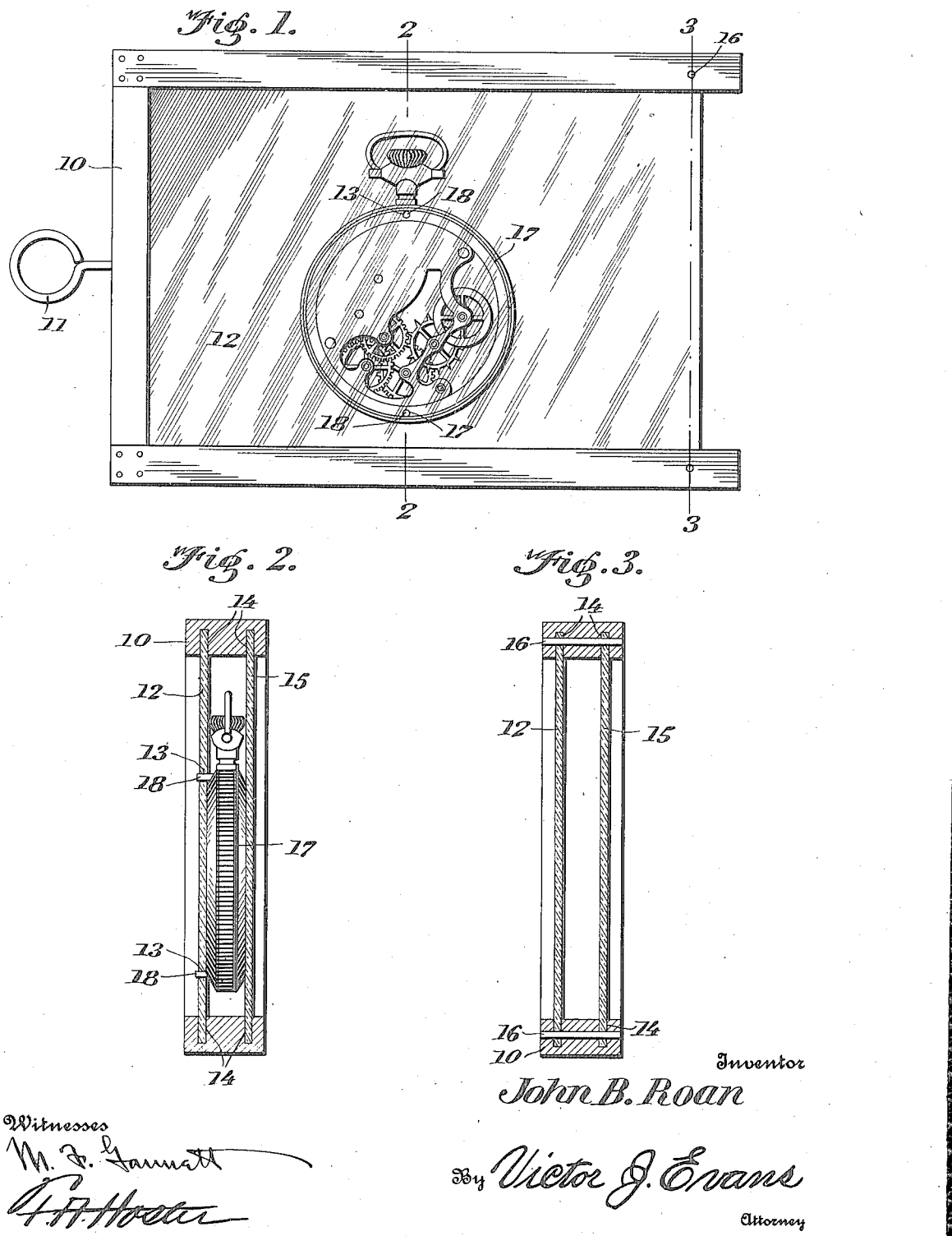

JOHN B. ROAN, OF ST. PETERSBURG, FLORIDA.

LANTERN-SLIDE.

1,206,253.

Specification of Letters Patent.

Patented Nov. 28, 1916.

Application filed April 3, 1914. Serial No. 829,338.

*To all whom it may concern:*

Be it known that I, JOHN B. ROAN, a citizen of the United States, residing at St. Petersburg, in the county of Pinellas and State of Florida, have invented new and useful Improvements in Lantern-Slides, of which the following is a specification.

The invention relates to machines for projecting pictures or slides upon a screen, and has for an object to provide a slide of a simple construction and which is adapted for use in projecting moving parts or moving mechanism upon a screen.

The invention contemplates, among other features, the provision of a slide which is particularly adapted for advertising purposes, as, for instance, in advertising a jewelry or watch business, and, as an example, contemplates a slide in which is suitably arranged a skeleton watch or the like, showing the moving parts thereof so that when the slide is interposed between a ray of light and the screen, with the light projecting upon the screen, the result will be an enlarged view of the skeleton watch and its moving parts actively projected upon the screen to the view of the public or audience.

In the further disclosure of the invention reference is to be had to the accompanying drawings, constituting a part of this specification, in which similar characters of reference denote corresponding parts in all the views, and in which:—

Figure 1 is a front view of the slide; Fig. 2 is a vertical sectional view taken on the line 2—2 in Fig. 1; and Fig. 3 is a vertical transverse sectional view taken on the line 3—3 in Fig. 1.

Referring more particularly to the views, I disclose a substantially rectangular frame 10 open at one end and provided at its other or closed end with a suitable horizontal handle 11. The frame 10 supports a front glass or other transparent member 12 which is preferably provided with a plurality of transverse apertures 13, and arranged to slide in suitable guideways 14 in the frame 12 is a rear glass 15 or other transparent member, said rear glass lying immediately behind the front glass 12 and spaced therefrom, as shown. Suitable pins 16 are adapted to pass through the rear glass 15 and the frame 10 and can either extend to the front glass 12 or pass therethrough as shown, thus holding the rear glass against removal from the frame and also tending to steady the front glass.

A member 17 in the nature of a skeleton watch or some other organized mechanism having moving parts is adapted to lie between the front and rear glasses and in order to position the member a plurality of the lateral pins 18 project from the member, and the member is adapted to be placed against the front glass prior to placing the rear glass in position, so that the pins 18 will project through the apertures 13 of the front glass, after which the rear glass 15 is slid into place on the frame and will thus hold the member between the glasses and against movement relatively thereto. As mentioned, the member may be in the nature of a skeleton watch and it will be apparent that when the same is secured in the frame 10 and the frame is interposed in a ray of light from a projecting machine such as a motion machine or magic lantern (not shown) the resultant projection on a screen (not shown) will be the outline of the watch or other member and the moving parts thereof actively reproduced and projected upon the screen. The device is preferably used as an advertisement of a jewelry or watch maker, although it will be understood that I do not limit myself to the use of a watch and that any mechanism having moving parts may be projected upon the screen in a similar manner.

It will be understood that I do not limit myself to the specific construction of the frame or component parts as shown in the drawings, and that various departures may be made from the disclosure in the views without departing from the spirit of the invention, the scope of which is defined in the appended claim.

Having thus described my invention, I claim:—

In an exhibiting slide, the combination with a frame, a transparent plate mounted in said frame, a self contained mechanism having laterally extending pins formed on one side thereof, said mechanism mounted on said plate and having the pins extending into the plate, and a second transparent plate detachably mounted in the frame and engaging the opposite side of said mechanism whereby the said pins will be held within the first mentioned plate.

In testimony whereof I affix my signature in presence of two witnesses.

JOHN B. ROAN.

Witnesses:
GEORGE M. COSLICK,
GERTRUDE M. NOEL.